(12) United States Patent
Belachew et al.

(10) Patent No.: US 12,472,171 B2
(45) Date of Patent: Nov. 18, 2025

(54) METHODS FOR TREATING HYPERCHOLESTEROLEMIA

(71) Applicant: BIOGEN MA INC., Cambridge, MA (US)

(72) Inventors: Shibeshih Belachew, Cambridge, MA (US); Ellen Cahir-McFarland, Cambridge, MA (US); Zhaohui Shao, Cambridge, MA (US); Hui-Hsin Tsai, Cambridge, MA (US); Ru Wei, Cambridge, MA (US)

(73) Assignee: BIOGEN MA INC., Cambridge, MA (US)

( * ) Notice: Subject to any disclaimer, the term of this patent is extended or adjusted under 35 U.S.C. 154(b) by 457 days.

(21) Appl. No.: 18/021,654

(22) PCT Filed: Aug. 19, 2021

(86) PCT No.: PCT/US2021/046591
§ 371 (c)(1),
(2) Date: Feb. 16, 2023

(87) PCT Pub. No.: WO2022/040371
PCT Pub. Date: Feb. 24, 2022

(65) Prior Publication Data
US 2023/0310405 A1 Oct. 5, 2023

Related U.S. Application Data

(60) Provisional application No. 63/067,786, filed on Aug. 19, 2020.

(51) Int. Cl.
*A61K 31/445* (2006.01)
*A61K 45/06* (2006.01)
*A61P 3/06* (2006.01)

(52) U.S. Cl.
CPC ............ *A61K 31/445* (2013.01); *A61K 45/06* (2013.01); *A61P 3/06* (2018.01)

(58) Field of Classification Search
CPC ................ A61K 31/445; A61P 3/06
(Continued)

(56) References Cited

FOREIGN PATENT DOCUMENTS

| WO | WO 2012109108 A1 * | 8/2012 | ............. A01N 43/40 |
| WO | 2014/018891 A1 | 1/2014 | |

OTHER PUBLICATIONS

Cerqueira et al., Cholesterol Biosynthesis: A Mechanistic Overview. Biochemistry. Oct. 4, 2016;55(39):5483-5506.
(Continued)

*Primary Examiner* — Jeffrey S Lundgren
*Assistant Examiner* — Heather Dahlin
(74) *Attorney, Agent, or Firm* — McCarter & English, LLP; Xin Zhang

(57) ABSTRACT

Disclosed is a method of lowering elevated cholesterol plasma levels in a subject. Also disclosed is a method of treating hypercholesterolemia in a subject. The methods comprise administering to the subject in the absence of a cholesterol lowering drug an effective amount of Compound 1 or pharmaceutically acceptable salt thereof.

(Compound 1)

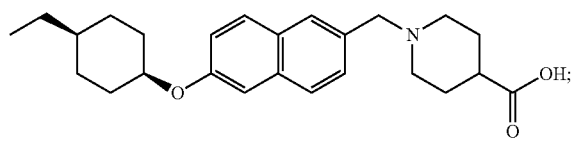

17 Claims, 4 Drawing Sheets

(58) Field of Classification Search
USPC .......................................................... 514/319
See application file for complete search history.

(56) References Cited

OTHER PUBLICATIONS

International Search Report and Written Opinion for Application No. PCT/US2021/046591, dated Nov. 4, 2021, 11 pages.

* cited by examiner

METHODS FOR TREATING HYPERCHOLESTEROLEMIA

CROSS REFERENCE TO RELATED APPLICATIONS

This application is a 35 U.S.C. § 371 national stage filing of International Application No. PCT/US2021/046591, filed on Aug. 19, 2021, which claims the benefit of the filing date, under 35 U.S.C. § 119(e), of U.S. Provisional Application No. 63/067,786, filed on Aug. 19, 2020, the entire contents of which are incorporated herein by reference.

BACKGROUND

High cholesterol is one of a number of risk factors for heart attack and stroke. Poor diet and lack of exercise are common causes of high cholesterol. High cholesterol can also have underlying genetic causes, such as in familiar hypercholesterolemia (FH). A number of cholesterol lowering drugs are currently on the market but they are not without risk or contraindications with certain conditions or other medications. Such drugs include statins, fibrates, niacin, bile acid sequestrants (resins), phytosterols, or other compounds that prevent absorption of fats, reduce absorption of cholesterol, or target genes in the cholesterol trafficking pathway. Because of the risks and contraindications associated with current cholesterol lowering drugs, there is a need for further medications that lower cholesterol in patients with high cholesterol levels.

SUMMARY

It has now been found that Compound 1, whose structure is shown below, is an inhibitor of multiple enzymes in the cholesterol biosynthesis pathway, including LBR/TM7SF2 and EBP.

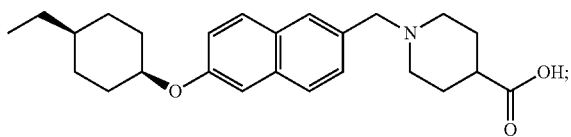

(Compound 1)

1-((6-(((1s,4s)-4-ethylcyclohexyl)oxy)naphthalen-2-yl)methyl)piperidine-4-carboxylic acid Specifically, Compound 1 reduces cholesterol levels in healthy human volunteers in a dose dependent manner (Example 1) and causes accumulation of 7-dehydrocholesterol (7-DHC). The accumulation of 7-DHC is also replicated in rat OPCs treated with Compound 1 (Example 2). Based on these discoveries, methods of lowering blood cholesterol levels in subjects in need thereof are disclosed herein.

One embodiment of the invention is a method of lowering elevated plasma cholesterol levels in a subject, comprising administering to the subject an effective amount of Compound 1:

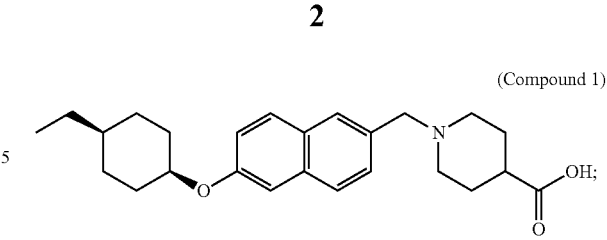

(Compound 1)

or a pharmaceutically acceptable salt thereof.

Another embodiment of the invention is a method of treating a subject with hypercholesterolemia, comprising administering to the subject an effective amount of Compound 1:

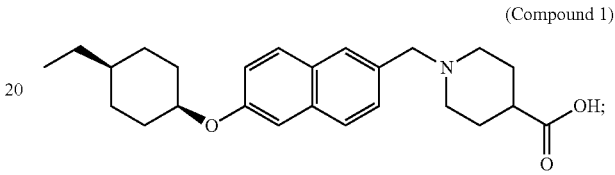

(Compound 1)

or a pharmaceutically acceptable salt thereof.

Another embodiment of the invention is an effective amount of Compound 1 or a pharmaceutically acceptable salt thereof for lowering elevated plasma cholesterol levels in a subject.

Another embodiment of the invention is the use of Compound 1 or a pharmaceutically acceptable salt thereof for the manufacture of a medicament for lowering elevated plasma cholesterol levels in a subject.

Another embodiment of the invention is an effective amount of Compound 1 or a pharmaceutically acceptable salt thereof for treating a subject with hypercholesterolemia.

Yet another embodiment of the invention is the use of an effective amount of Compound 1 or a pharmaceutically acceptable salt thereof for the manufacture of a medicament for treating a subject with hypercholesterolemia.

DETAILED DESCRIPTION

Figure 1:
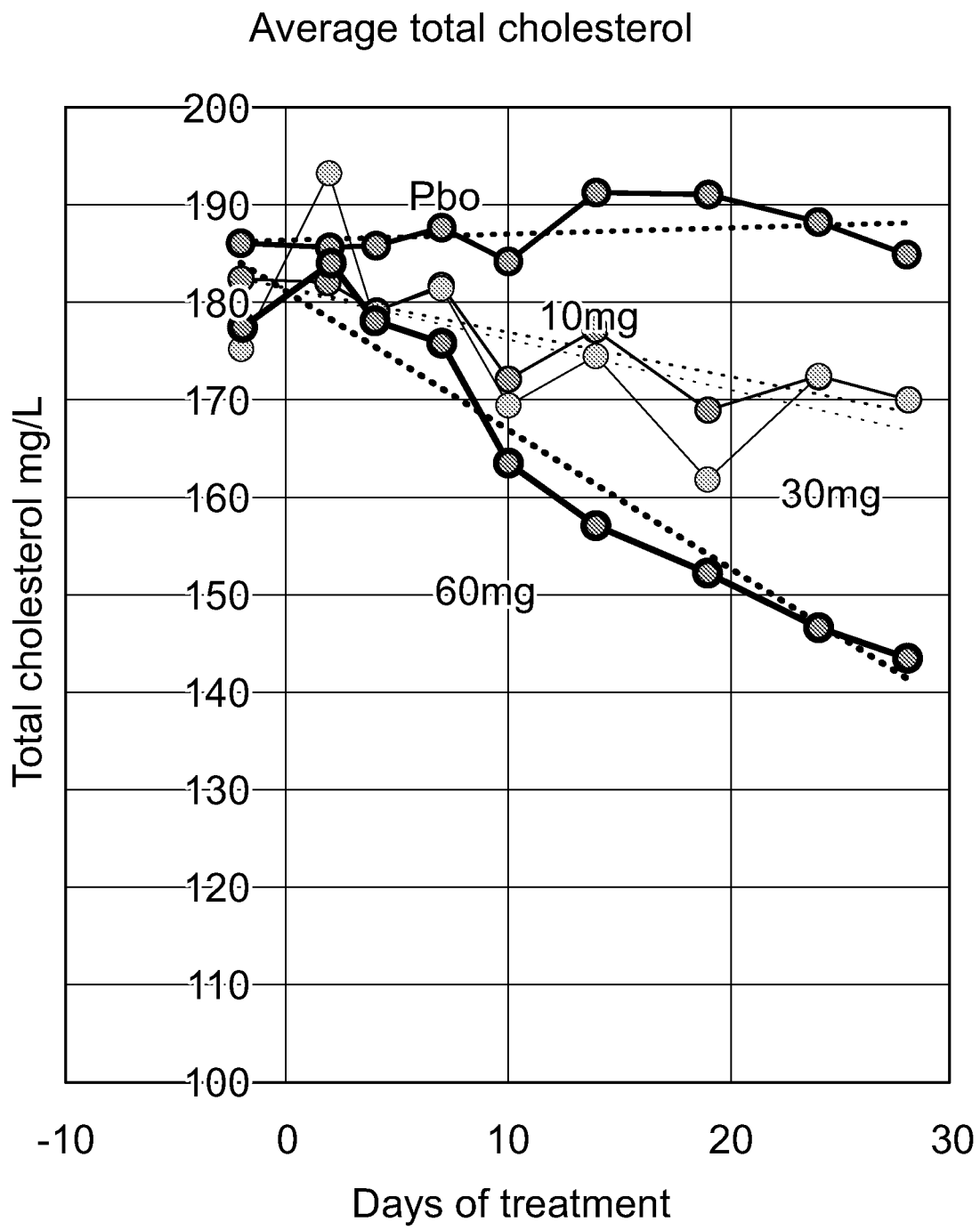
FIG. 1 shows a time course of reduction in circulating mean total cholesterol levels in healthy volunteers administered placebo, 10 mg, 30 mg or 60 mg per day of Compound 1 over a 28 day period.

Treatment with Compound 1 inhibits cholesterol biosynthesis and therefore results in decreased plasma levels of cholesterol, in particular, peripheral cholesterol, within a patient. Based on the results, methods of lowering elevated plasma levels of cholesterol in a subject and treating hypercholesterolemia in a subject are disclosed herein. In accordance with the methods described herein, in some embodiments, Compound 1 or a pharmaceutically acceptable salt thereof decreases cholesterol in the periphery in humans but does not significantly decrease cholesterol in the central nervous system based on animal data.

A subject with hypercholesterolemia has elevated plasma levels of cholesterol. "Elevated plasma levels of cholesterol" refers to blood plasma levels greater than 170 mg/dL (milligrams per deciliter), greater than 200 mg/d, greater than 210 mg/dL, greater than 220 mg/dL, greater than 230 mg/dL, greater than 240 mg/dL, greater than 250 mg/dL, greater than 260 mg/dL, greater than 270 mg/dL, greater than 300 mg/dL, greater than 3300 mg/dL, or greater than 3600 mg/dL.

The disclosed methods can be used to lower plasma cholesterol levels in diseases or conditions associated with or characterized by elevated blood cholesterol levels. A "disease or condition associated with or characterized by elevated blood cholesterol levels" refers to a disease or condition in which elevated blood cholesterol levels is a common or typical symptom. Examples include familial hypercholesterolemia, atherosclerosis, acute coronary syndrome (ACS), coronary artery disease, peripheral arterial disease (PAD), cerebral vascular disease, diabetes derived cardiovascular diseases, macular degeneration or congestive heart failure.

Compound 1 can be co-administered to a subject with elevated plasma cholesterol levels or with hypercholesterolemia in combination with an effective amount of another cholesterol lowering drug. When co-administered with another drug effective for treating hypercholesterolemia or lowering elevated plasma cholesterol levels, Compound 1 and the other drug can be administered at the same time (in the same or different formulations) or at different times.

A "cholesterol lowering drug" is a drug prescribed for and/or administered for the purpose of lowering cholesterol in human patients with elevated cholesterol levels. Examples include statins, PCSK9 inhibitors, selective cholesterol absorption inhibitors, bile acid sequestrants, fibrates or lipid-lowering therapies.

A statin is a cholesterol lowering drug that acts by inhibiting HMG-CoA reductase. Examples include atrvastatin (LIPITOR®), fluvastatin (LESCOL XL®), lovastatin (ALTOPREV®), pitavastatin (LIVALO®), pravastatin (PRAVACHOL®), rosuvastatin (CRSTOR®, EZALLOR™) and simvastatin (ZOCAR®, FLOLIPID®).

A PCSK9 inhibitor is a cholesterol lowering drug that acts by inhibiting proprotein convertase subtilisin/kexin type 9 serine protease. Examples include alirocumab and evolocumab.

A selective cholesterol absorption inhibitor is a cholesterol lowering drug that acts by inhibiting absorption of cholesterol in the intestines. For example, ezetimibe (ZEITA®) is a selective cholesterol abruption inhibitor that acts by acts by inhibiting the transporter, Niemann-Pick C-1-like 1 protein (NPC 1L1).

A bile acid sequesterant is a cholesterol lowering drug that acts by binding bile acids in the intestine and increasing the excretion of bile acids in the stool. This reduces the amount of bile acids returning to the liver and forces the liver to produce more bile acids to replace the bile acids lost in the stool. In order to produce more bile acids, the liver converts more cholesterol into bile acids, which lowers the level of cholesterol in the blood. Examples include cholestyramine (QUESTRAN®, PREVALITE®), colestipol (COLESTID®) and colesevelam (WELCHOL®).

Fibric acid derivatives (fibrates) are a class of medication that lowers blood triglyceride levels. Fibrates lower blood triglyceride levels by reducing the liver's production of VLDL (the triglyceride-carrying particle that circulates in the blood) and by speeding up the removal of triglycerides from the blood. Fibrates also are modestly effective in increasing blood HDL cholesterol levels. Examples of fibrates include gemfibrozil (LOPID®) and fenofibrate (TRJICOR®, FIBRICOR®).

Other cholesterol lowering drugs include fish oils, niacin (nitotinic acid) cholestin, bempedoic acid (NEXLETOL®) and probucol.

"Effective amount" means an amount of a drug that alleviates one or more symptoms of a disease or condition and/or slows the progression of the disease or condition. With respect to Compound 1 used to treat hypercholesterolemia or to lower elevated plasma cholesterol levels, an "effective amount" includes an amount that lowers plasma cholesterol levels or otherwise alleviates the symptoms of the disease or condition associated with elevated plasma cholesterol levels. Examples include, but are not limited to a decrease in atherosclerosis, a decrease in artery wall stiffness, a decrease in isolated systolic hypertension. Exemplary effective amounts for Compound 1 for lowering elevated plasma cholesterol levels or treating hypercholesterolemia include, but are not limited to, 10 mg to 60 mg per day (or an amount of a pharmaceutically acceptable salt of Compound 1 equivalent to 10 to 60 mg of Compound 1), e.g., 10 mg per day, 30 mg per day or 60 mg per day. Exemplary effective amounts of pharmaceutically acceptable salts of Compound 1 include, but are not limited to, an amount equivalent to 10 mg per day to 60 mg per day of Compound 1, e.g., an amount equivalent to 10 mg per day, 30 mg per day or 60 mg per day of Compound 1. In some embodiments, an effective amount for Compound 1 can be between 10 mg and 20 mg per day, between 20 mg and 30 mg per day, between 30 mg and 40 mg per day, between 40 mg and 50 mg per day or between 50 mg and 60 mg per day. In some embodiments, an effective amount of a pharmaceutically acceptable salt of Compound 1 can be an amount equivalent to 10 mg to 20 mg per day, 20 mg to 30 mg per day, 30 mg to 40 mg per day, 40 mg to 50 mg per day or 50 mg to 60 mg per day of Compound 1.

As used herein, when a range of values is expressed, it includes both endpoints. For example, an amount of 10 mg to 60 mg includes 10 mg and 60 mg. Similarly, an amount between 10 mg and 20 mg includes 10 mg and 20 mg.

"Subject" and "patient" may be used interchangeably, and mean a mammal in need of treatment, e.g., companion animals (e.g., dogs, cats, and the like), farm animals (e.g., cows, pigs, horses, sheep, goats and the like) and laboratory animals (e.g., rats, mice, guinea pigs and the like). Typically, the subject is a human in need of treatment.

Synthetic preparations for Compound 1 and suitable formulations for Compound 1 are described in U.S. Pat. No. 9,340,527, the entire teachings of which are incorporated herein by reference.

The two substituents on the cyclohexyl group in Compound 1 have a cis configuration relative to each other. When referring to Compound 1 by name or structure, its stereochemical purity is at least 90%, at least 95%, at least 98% or at least 99% by weight. Stereochemical purity is the weight ratio of compound in the cis configuration over the sum of the compound in the cis and trans configuration.

The invention is illustrated by the following examples, which is not intended to be limiting in any way.

EXEMPLIFICATION

Example 1—Compound 1 Inhibits DHCR7 Activity as Evidenced by the Accumulation of 7-DHC Forty-two healthy volunteers received Compound 1 QD for 28 days (or before early withdrawal), with 6 individual participants per cohort receiving 1 mg (Cohort 1), 3 mg (Cohort 2), 10 mg (Cohort 3), 30 mg (Cohort 4), 60 mg loading dose with 10 mg maintenance dosing (Cohort 5) Compound 1, 60 mg (Cohort 6), or 90 mg loading dose on Day 1 and Day 2 with 30 mg maintenance dosing (Cohort 7). There were also 14 participants who received placebo in the study; 1 participant in Cohort 4 was misdosed on Day 19 and appeared to have received at least one 30 mg dose of Compound 1. The following protocol deviations were reported for participants in Cohorts 1 through 5: they received predose water ad lib (not restricted for 1 hour before and 1 hour after dose) and a meal administered 30 minutes postdose (not 4 hours postdose). A total of 49 participants completed treatment, including 37 participants who received active treatment.

Participants received the first dose of study treatment (Compound 1 or placebo) on Day 1 and continued to receive once-daily study treatment through Day 28. Participants remained in the clinic throughout the dosing period. Participants were discharged on Day 29 after completing all assessments.

Blood was periodically withdrawn from each volunteer and immediately stored at −80° C. For measuring metabolite concentrations in human serum, the samples were centrifuged and the resulting supernatant was used for further analysis.

Free oxysterols were extracted from the samples with methanol using the Biocrates Kit filter plate. The plate was loaded with an internal standard mixture beforehand. The metabolite concentrations were determined by UHPLC-MS/MS with multiple reaction monitoring (MRM) in a positive mode using a SCIEX API 5500 QTRAP® (AB SCIEX, Darmstadt, German) instrument with electrospray ionization (ESI). Data were quantitated using appropriate mass spectrometry software and imported in Biocrates Met/DQ™ software for further analysis.

Circulating mean total cholesterol levels in the healthy volunteers are shown in FIG. 1, which demonstrates a gradual, time- and dose-dependent reduction in total circulating cholesterol.

Based on these observations, a population PK/PD model was developed using Monolix to describe circulating cholesterol concentration as a function of plasma concentration of Compound 1 and exposure. The model was developed from cholesterol data from the study described above (Study 1) as well as two additional clinical studies (Study 2 and Study 3) in healthy volunteers. In Study 2, thirty healthy volunteers received a single oral dose of Compound 1 with 6 individual participants per cohort receiving 3 mg (Cohort 1), 10 mg (Cohort 2), 30 mg (Cohort 3), 60 mg (Cohort 4), 100 mg (Cohort 5). There were also 9 participants who received placebo in the study. In Study 3, 8 healthy adult volunteers received a single dose of 30 mg of Compound 1.

The concentration of circulating cholesterol in this model is reduced at all daily doses higher than 10 mg. Although data variability impacts the predicted effects, the model shows clear evidence for a dose-dependent reduction in circulating cholesterol concentration. The $EC_{50}$ for this reduction is about 3 µg/mL, which approximates the steady-state concentration of Compound 1 at a daily dose of 60 mg.

Figure 2:
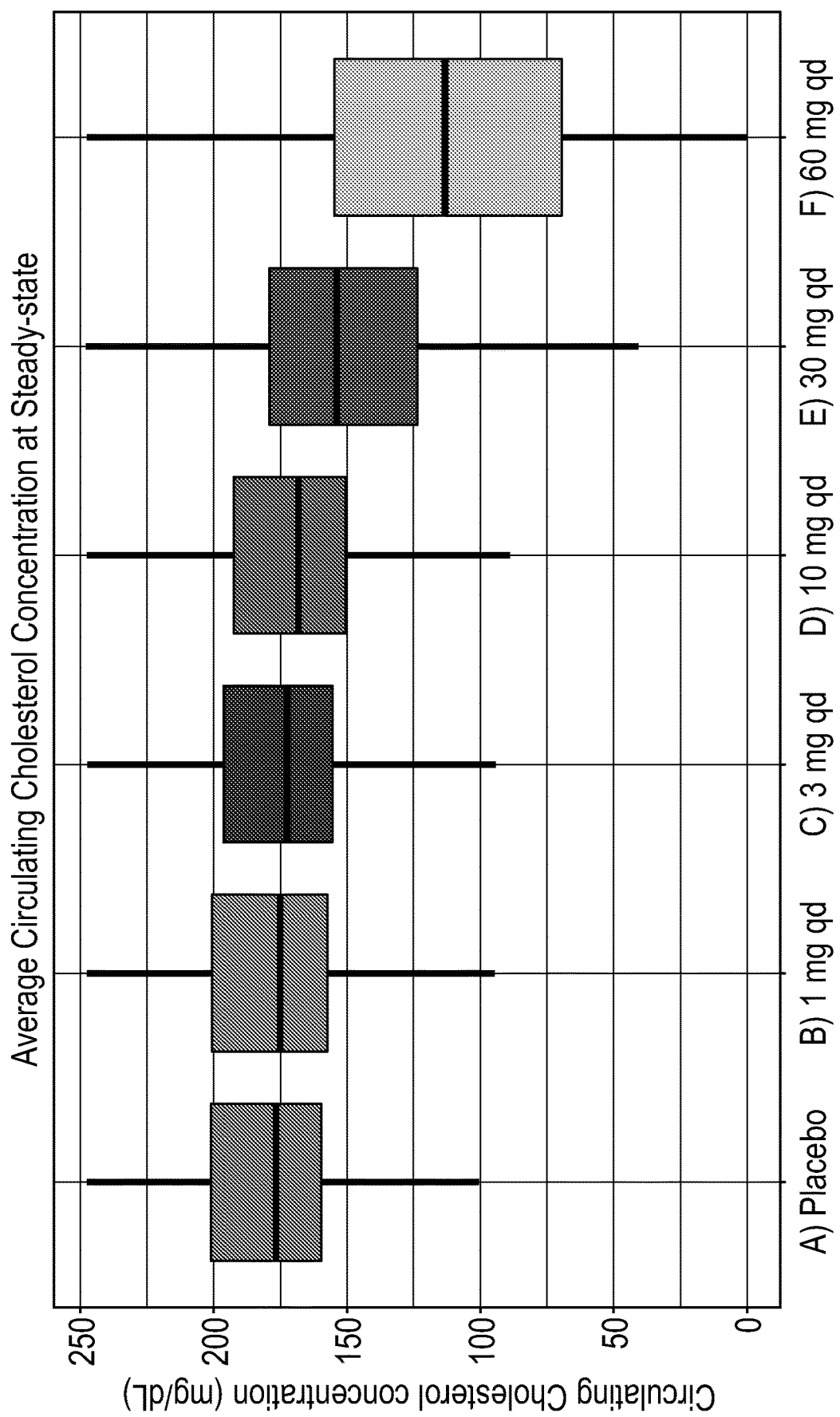
FIG. 2 is a bar graph showing predicted steady-state concentrations of circulating cholesterol levels during treatment with Compound 1 for subject administered placebo, 1 mg, 3 mg, 10 mg, 30 mg or 60 mg per day of Compound 1 at pharmacodynamic steady-state. The predicted concentrations are from simulations based on data from three phase I trials of Compound 1.

Healthy volunteers receiving the 60 mg dose in Study 1 had an average decrease of up to approximately 20% in total cholesterol, which is currently believed to affect the low-density lipoprotein fraction to a greater extent than the high-density lipoprotein fraction. The model predicts that circulating cholesterol could decrease by approximately 35% at a dose level of 60 mg QD. Higher doses of Compound 1 could result in a greater reduction of circulating cholesterol levels but are also likely to cause neutropenia. The reduction in circulating cholesterol is predicted to occur over a time frame commensurate with the increase to steady-state concentrations of Compound 1 in plasma (approximately 15 days), after which circulating cholesterol levels are predicted to stabilize for the duration of dosing. The model predicts that after discontinuation of Compound 1 treatment, circulating cholesterol will return to baseline levels within approximately 30 days. The model also predicts that both the rate of decrease and restoration of circulating cholesterol levels is limited by the accumulation and clearance rate of Compound 1 in plasma. The predicted steady-state concentrations of circulating cholesterol during treatment with Compound 1 in the dose range used in clinical studies are shown in FIG. 2.

Example 2—Compound 1 Caused Accumulation of 7-DHC, Reduction of Desmosterol and No Change in Cholesterol in Rat OPCs Enriched populations of oligodendrocytes from female Sprague Dawley postnatal day 2 (P2) rats were grown in culture. Briefly, the forebrain was dissected and placed in Hank's buffered salt solution (HBSS) (Life technologies). The tissue was cut into 1 mm fragments and incubated at 37° C. for 15 min in 0.01% trypsin and 10 µg/ml DNase. Dissociated cells were plated on poly-D-lysine (PDL)-coated T75 tissue culture flasks and grown at 37° C. for 10 days in Dulbecco's Modified Eagle Medium (DMEM) with 20% fetal calf serum (Life technologies). Oligodendrocyte precursors (A2B5+) were collected by shaking the flask overnight at 200 rpm at 37° C., resulting in a 95% pure population. Cultures were maintained in a defined growth medium (high glucose DMEM, 0.1% BSA, 50 ug/ml Apo-transferrin, 5 ug/ml insulin, 30 nM sodium selenite, 10 nM biotin and hydrocortisone) with 10 ng/ml fibroblast growth factor/platelet-derived growth factor (FGF/PDGF) (Peprotech) for 2-3 days. For assessing the ability of Compound 1 to promote the differentiation of rat A2B5+ progenitor cells into mature myelin basic protein positive (MBP+) myelinating oligodendrocytes, A2B5+ cells were plated into 10-cm PDL coated culture plates in FGF/PDGF free growth medium supplemented with 10 ng/ml CNTF and 15 nM T3 and were immediately treated for with Compound 1. The cell pellets were collected at 24 hours and 72 hours in culture and stored at −80° C. The cell pellets were subsequently shipped to Metabolon (Morrisville, NC, USA) and maintained at −80° C. during shipping and storage until processed. The cell pellet samples were extracted with methanol under vigorous shaking for 2 min (Glen Mills GenoGrinder 2000) to precipitate protein and dissociate small molecules bound to protein or trapped in the precipitated protein matrix, followed by centrifugation to recover chemically diverse metabolites. The resulting extract were next aliquot and analyzed on Metabolon's HD4 platform. Several types of quality control samples, including recovery standards added prior to extraction, technical replicates from a pool combined from each experimental sample, process and solvent blanks, and spiked a cocktail of QC standards, were applied during sample preparation and analysis for quality assessment and filtering failed samples.

Figure 3:
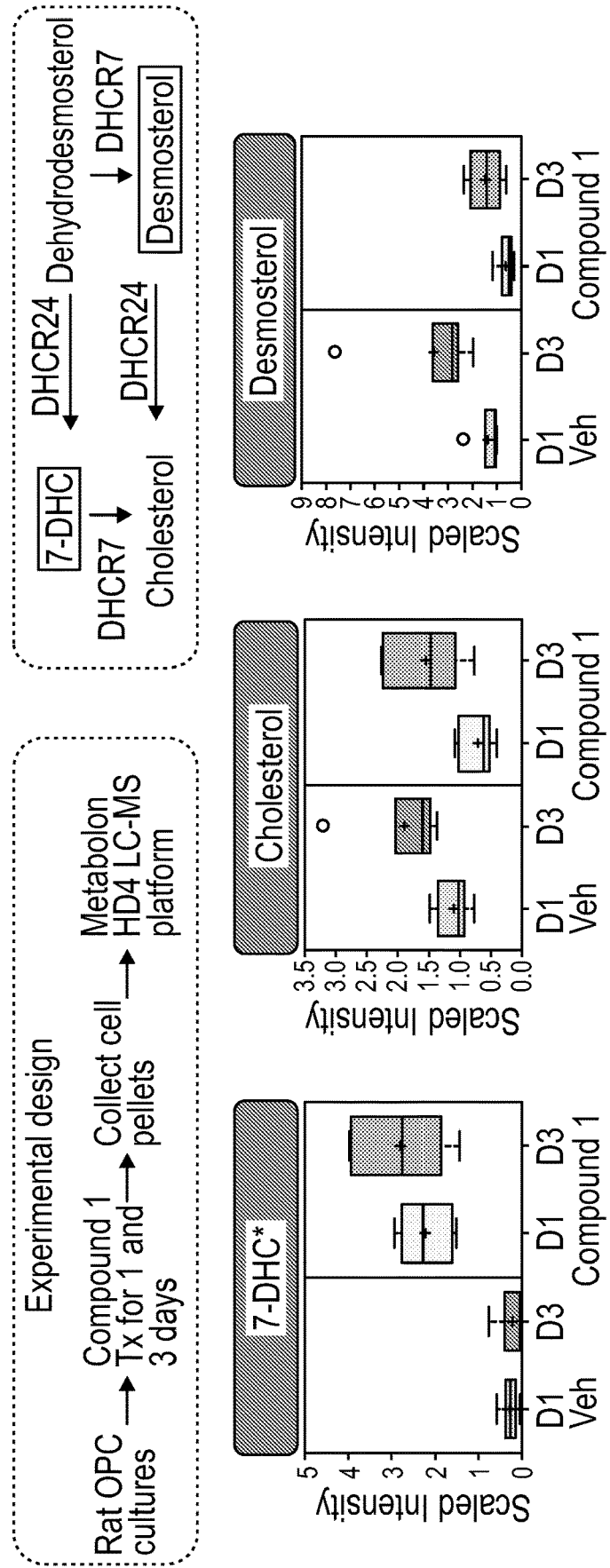
FIG. 3 are bar graphs showing changes in the levels of 7-DHC, cholesterol and desmosterol in rat OPC cultures treated with Compound 1.
Figure 4:
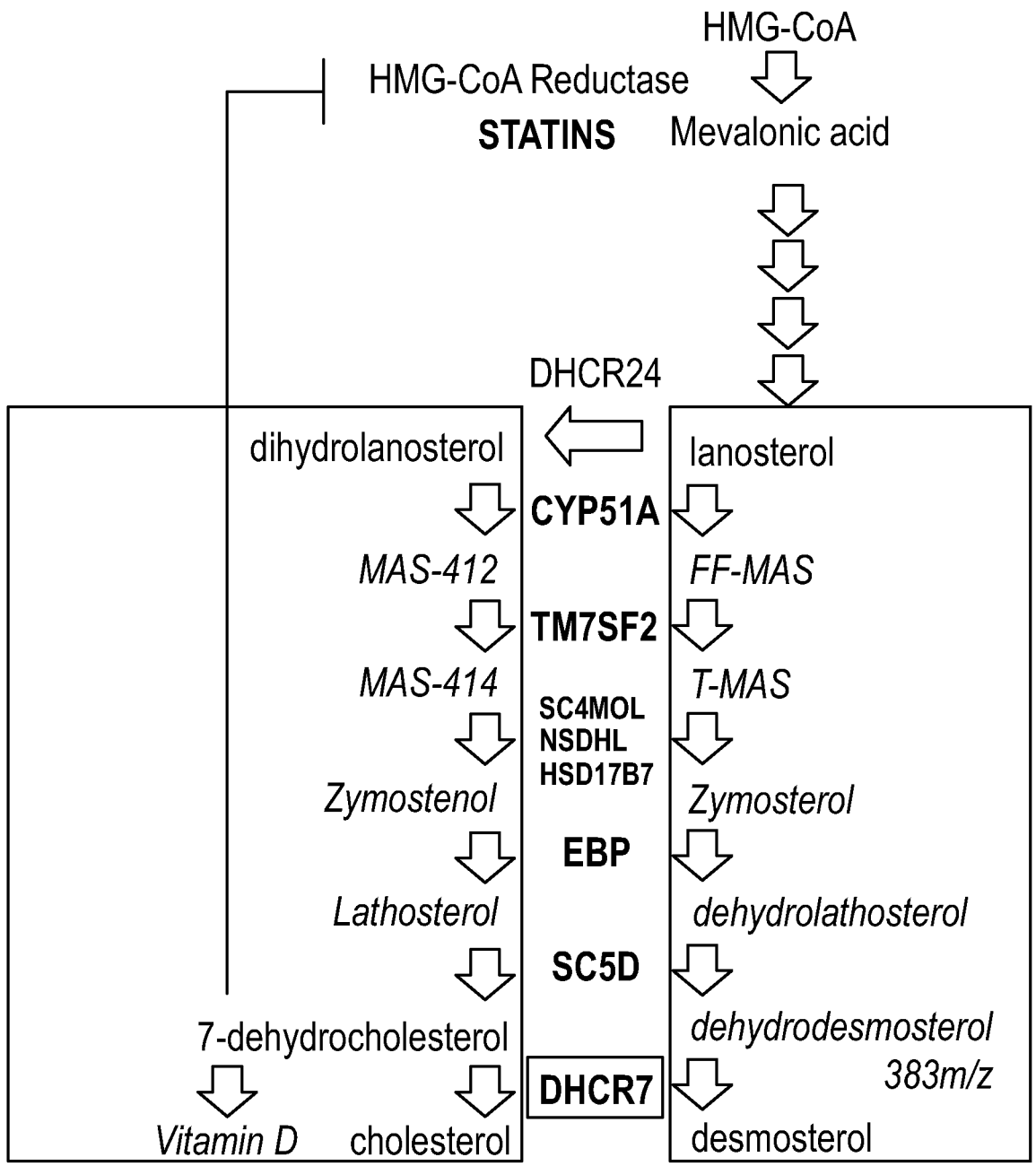
FIG. 4 is a diagram showing the biosynthetic pathway of cholesterol and desmosterol.

The Metabolon data revealed that Compound 1 treatment resulted in increased DHCR7 substrate 7-DHC accumulation and decreased or trendily decreased accumulation of DHCR7 products, desmosterol and cholesterol, in culture when comparing to the vehicle control of the same time point. At 24 hours, Compound 1 treated OPC culture showed 8.3 folds of 7-DHC (p=2.5e-5, q=0.005), 0.44 folds of desmosterol (p=0.002, q=0.15), and 0.64 folds of cholesterol (p=0.018, q=0.15). By 72 hours, Compound 1 treated OPC culture showed 12.86 folds of 7-DHC (p=8.1e-8, q=2.6e-5), 0.4 folds of desmosterol (p=0.001, q=0.022), and insignificant change of cholesterol. See FIG. 3.

The data suggest that although Compound 1 is shown to decrease peripheral cholesterol level in humans, it does not decrease cholesterol level in rat OPCs.

What is claimed is:

1. A method of lowering elevated plasma cholesterol levels in a subject, comprising administering to the subject in need thereof an effective amount of Compound 1:

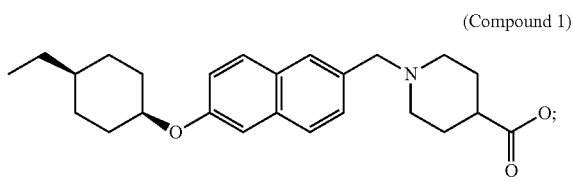

(Compound 1)

or a pharmaceutically acceptable salt thereof.

2. A method of treating a subject with hypercholesterolemia, comprising administering to the subject in need

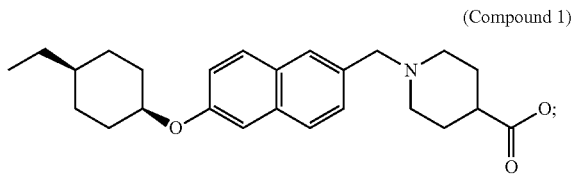

(Compound 1)

thereof an effective amount of Compound 1:
or a pharmaceutically acceptable salt thereof.

3. The method of claim 1, wherein the elevated plasma cholesterol levels are associated with familial hypercholesterolemia, atherosclerosis, acute coronary syndrome (ACS), coronary artery disease, peripheral arterial disease (PAD), cerebral vascular disease, diabetes derived cardiovascular diseases, macular degeneration or congestive heart failure.

4. The method of claim 1, further comprising co-administering an effective amount of a second pharmaceutically active agent to the subject, wherein the second pharmaceutically active agent is a cholesterol lowering drug.

5. The method of claim 4, where the cholesterol lowering drug is a statin, a PCSK9 inhibitor, a selective cholesterol absorption inhibitor, a bile acid sequestrant, a fibrate or a lipid-lowering therapy.

6. The method of claim 1, wherein the subject is administered from 10 mg to 60 mg per day of Compound 1 or an amount of a pharmaceutically acceptable salt thereof that is equivalent to from 10 mg to 60 mg per day of Compound 1.

7. The method of claim 1, wherein the subject is administered from 10 mg to 60 mg per day of Compound 1.

8. The method of claim 1, wherein the subject is administered 10 mg/day of Compound 1.

9. The method of claim 1, wherein the subject is administered 30 mg/day of Compound 1.

10. The method of claim 1, wherein the subject is administered 60 mg/day of Compound 1.

11. The method of claim 2, further comprising co-administering an effective amount of a second pharmaceutically active agent to the subject, wherein the second pharmaceutically active agent is a cholesterol lowering drug.

12. The method of claim 11, where the cholesterol lowering drug is a statin, a PCSK9 inhibitor, a selective cholesterol absorption inhibitor, a bile acid sequestrant, a fibrate or a lipid-lowering therapy.

13. The method of claim 2, wherein the subject is administered from 10 mg to 60 mg per day of Compound 1 or an amount of a pharmaceutically acceptable salt thereof that is equivalent to from 10 mg to 60 mg per day of Compound 1.

14. The method of claim 2, wherein the subject is administered from 10 mg to 60 mg per day of Compound 1.

15. The method of claim 2, wherein the subject is administered 10 mg/day of Compound 1.

16. The method of claim 2, wherein the subject is administered 30 mg/day of Compound 1.

17. The method of claim 2, wherein the subject is administered 60 mg/day of Compound 1.

* * * * *